(12) United States Patent
Medvinsky et al.

(10) Patent No.: US 11,456,866 B2
(45) Date of Patent: Sep. 27, 2022

(54) KEY LADDER GENERATING A DEVICE PUBLIC KEY

(71) Applicant: ARRIS Enterprises LLC, Suwanee, GA (US)

(72) Inventors: Alexander Medvinsky, San Diego, CA (US); Tat Keung Chan, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/938,367

(22) Filed: Jul. 24, 2020

(65) Prior Publication Data

US 2021/0028933 A1 Jan. 28, 2021

Related U.S. Application Data

(60) Provisional application No. 62/878,187, filed on Jul. 24, 2019.

(51) Int. Cl.
*H04L 9/08* (2006.01)
*H04L 9/30* (2006.01)
*H04L 9/32* (2006.01)

(52) U.S. Cl.
CPC .......... *H04L 9/0866* (2013.01); *H04L 9/3013* (2013.01); *H04L 9/3066* (2013.01); *H04L 9/3268* (2013.01)

(58) Field of Classification Search
CPC ... H04L 9/0866; H04L 9/3013; H04L 9/3066; H04L 9/3268; H04L 9/0822;
(Continued)

(56) References Cited

U.S. PATENT DOCUMENTS 8,364,964 B2   1/2013  Medvinsky et al.
2006/0184796 A1  8/2006  Fahrny
(Continued)

OTHER PUBLICATIONS

L.Velvindron et al.,"Increase the Secure Shell Minimum Recommended Diffie-Hellman Modulus Size to 2048 Bits", RFC8270, Dec. 2017 [online][retrieved on Oct. 18, 2021], Retrieved from: https://datatracker.ietf.org/doc/html/rfc8270 (Year: 2017).*

(Continued)

*Primary Examiner* — Philip J Chea
*Assistant Examiner* — Sangseok Park
(74) *Attorney, Agent, or Firm* — Chernoff, Vilhauer, McClung & Stenzel, LLP

(57) ABSTRACT

A method is provided for generating a key ladder for securely communicating between a first device and a second device using a first device symmetric key and a chip-unique private key. The method includes generating a second processor-specific first device symmetric key from a first processor-specific first device symmetric key and a first identifier (CPU_ID), generating a chip-unique first device application private key (CUAPrK) from a second identifier and the second processor-specific first device symmetric key, generating a chip-unique first device application public key (CUAPuK) from the chip-unique first device application private key (CUAPrK), and transmitting the chip-unique first device application public key (CUAPuK) and an identifier of the processor to the second device.

20 Claims, 12 Drawing Sheets

(58) Field of Classification Search
CPC ............ H04L 9/0847; H04N 21/26613; H04N 21/26606; H04N 21/4405; H04N 21/2347; H04N 21/4623; H04N 21/4181
See application file for complete search history.

(56) References Cited

U.S. PATENT DOCUMENTS

| | | | |
|---|---|---|---|
| 2007/0239605 A1 | 10/2007 | Munguia et al. | |
| 2017/0006025 A1* | 1/2017 | Liu | G06F 21/10 |
| 2017/0085543 A1* | 3/2017 | Choi | H04L 63/0435 |
| 2017/0214662 A1* | 7/2017 | Chu | H04L 9/006 |
| 2018/0083933 A1* | 3/2018 | Mullen | G06F 21/10 |
| 2019/0052467 A1* | 2/2019 | Bettger | G06F 21/602 |
| 2019/0074981 A1* | 3/2019 | Loreskar | H04L 9/0861 |
| 2019/0089546 A1* | 3/2019 | Garcia Morchon | H04L 9/0847 |
| 2020/0127813 A1* | 4/2020 | Millar | H04L 9/0866 |
| 2020/0344047 A1* | 10/2020 | Allen | H04L 9/0819 |

OTHER PUBLICATIONS

PCT International Search Report & Written Opinion dated Oct. 14, 2020 for PCT Application No. PCT/US2020/043541.
Menezes, A, et al., Chapter 12: Key Establishment Protocols ED, Handbook of Applied Cryptography; CRC Press Series on Discrete Mathematices and Its Applications, 1996, CRC Press, Boca Raton, FL, US, pp. 489-541.

* cited by examiner

KEY LADDER GENERATING A DEVICE PUBLIC KEY

CROSS REFERENCE TO RELATED APPLICATIONS

This application claims benefit of U.S. Provisional Patent Application No. 62/878,187, entitled "KEY LADDER GENERATING A DEVICE PUBLIC KEY," by Alexander Medvinsky and Tat Keung Chan, filed Jul. 24, 2019, which application is hereby incorporated by reference herein.

BACKGROUND

1. Field

The present disclosure relates to systems and methods for securing information, and in particular to a system and method for securing communications using a device public key generated using a key ladder.

2. Description of the Related Art

Key ladders are well known in the areas of Conditional Access and secure video System-on-Chip (SoC) designs. Key ladders allow a single device or security chip to derive different chip-unique keys for different purposes, even though all of the keys associated with a particular chip are derived from a single root key such as a one-time programmable (OTP) key.

Key ladders are typically implemented using symmetric keys. A symmetric key represents a share secret between two or more parties that can be used to maintain a private information link. However, with symmetric key ladders, the compromise of a server with a database of device symmetric keys compromises the secret keys in all devices.

Symmetric keys are differentiated from asymmetric keys such as public/private key pairs.

Public keys are typically widely disseminated, and private keys which are known only to the owner. In such a system, any person can encrypt a message using the receiver's public key, but that encrypted message can only be decrypted with the receiver's private key. The generation of such keys depends on cryptographic algorithms based on mathematical problems to produce one-way functions. Effective security only requires keeping the private key private. The public key can be openly distributed without compromising security.

Key ladders using symmetric keys do not take advantage of public key cryptography, in which a compromise of a public key does not compromise the related private keys. Since the private key cannot be derived from the public key, a server that contains only device public keys cannot be exploited to reveal any private (and secret) keys associated with devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a system and method for generating a key ladder for securely communicating between a first device and a second device, such as a server. In one embodiment, the method comprises generating, in the first device having a processor, a second processor-specific first device symmetric key from a first processor-specific first device symmetric key and a first identifier (CPU_ID), generating, in the first device, a chip-unique first device application private key (CUAPrK) from a second identifier and the second processor-specific first device symmetric key, generating, in the first device, a chip-unique first device application public key (CUAPuK) from the chip-unique first device application private key (CUAPrK), and providing the chip-unique first device application public key (CUAPuK) and an identifier of the processor to the second device. A related embodiment further comprises receiving, in the first device, a second device public key from the second device, computing a shared symmetric key K from a second device public key and the chip-unique first device private key, where symmetric key K is utilized as the first processor-specific first device symmetric key. In a still further embodiment, the first processor specific first device symmetric key is a chip symmetric key generated from a chip private key and a global public key. In this embodiment, the chip private key can be used to derive a chip public key which can be transmitted to another entity to generate (using a global private key associated with the global public key) a chip symmetric key. In a still further embodiment, the chip private key is generated from an OTP value and key parameters.

Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

Figure 1A:
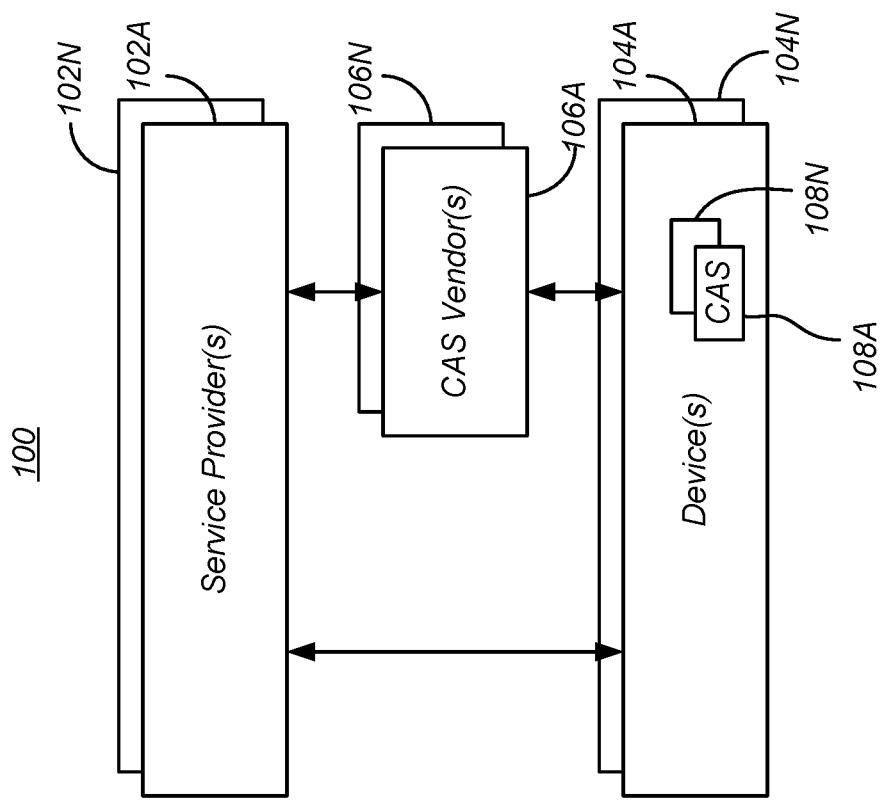
FIG. 1A is a diagram of a data distribution system.

FIG. 1A is a diagram of a data distribution system 100. The data distribution system includes one or more service providers 102A-102N (hereinafter alternatively referred to as service provider(s) 102) that provide data to one or more devices 104A-104N (hereinafter alternatively referred to as device(s) 104). In one embodiment, the data comprises media programs, and the devices 104 are consumer electronics devices that are disposed in subscribers' homes. To assure that the data is available only to authorized devices, one or more conditional access systems (CAS) 108A-108N (hereinafter alternatively referred to as CAS(s) 108) at least partially implemented on the devices 104 may be used. Such CAS systems 108 typically permit decryption of data encrypted by the service providers 102 by only authorized devices 104. In some embodiments, the service provider 102 provides a CAS 108 that is implemented on the on the device 104, and manages the CAS 108. In other embodiments, the CAS 108 is provided by one or more CAS vendor 106A-106N (alternatively referred to hereinafter as CAS vendor(s) 106). Hence, a single device 104 may implement a plurality of CAS 108 sourced from a plurality of CAS vendors 10. Each of the devices 104 may comprise, for example, a computer or a set top box (STB) for receiving and decrypting media programs for presentation to users. In one embodiment, the devices 104 are also capable of communicating with other devices 104.

Figure 1B:
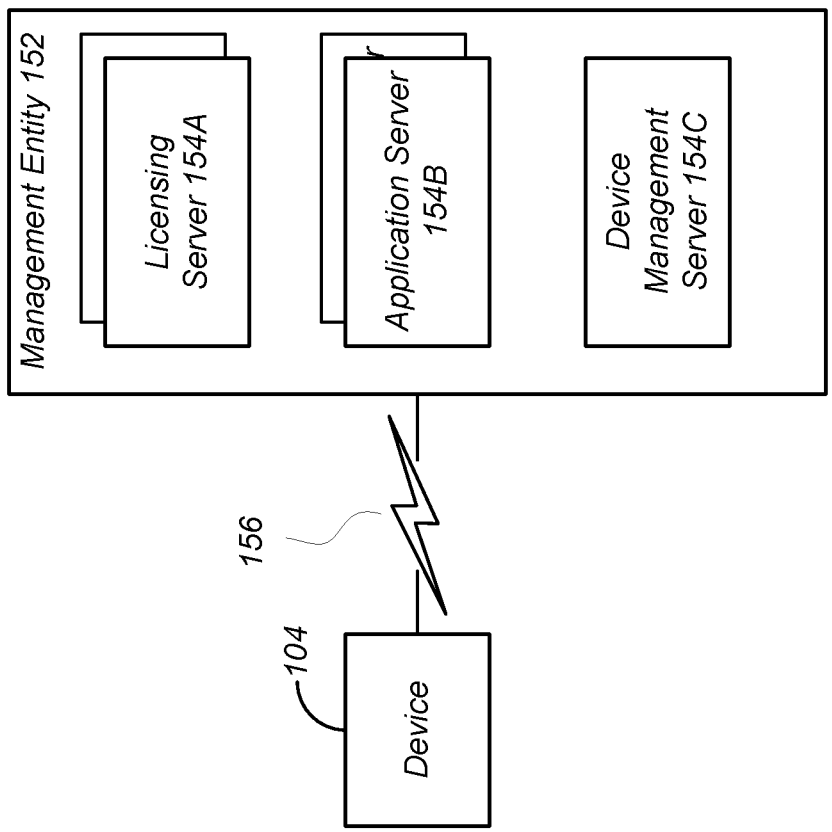
FIG. 1B is a diagram illustrating another aspect of the data distribution system.

FIG. 1B is a diagram illustrating another aspect of the data distribution system 100. A management entity 152 (which may be a part of the service provider 102 or the CAS vendor 106 or another entity) communicates security data with the device 104 via communication link 156, which may comprise a wired or wireless communication link. In one embodiment, the communications link 156 is implemented via the Internet.

The management entity 152 may comprises one or more of a plurality of other devices. Such devices may include a licensing server 154A, application server 154B, and devices management server 154C (hereinafter alternatively referred to as server(s) 154) as described further below. Each of the servers 154 may be permitted to have different levels of authority and hence different levels of access to keys in the key ladders described herein.

The licensing server 154A typically manages the digital rights management (DRM) system of the associated CAS vendor 106, which may execute a plurality of applications. The application server 154B may be used in the development and maintenance of only applications, and hence is typically only able to derive keys associated with particular applications and those keys below the application key in the key ladder. The device management server 154C manages the device 104 across all CAS and application, and hence, is typically able to derive any of the keys associated with the device 104, including all of the keys in the key ladder. Such a general purpose device management server 154C may be a server utilized during development to emulate all possible applications that talk to that one device 104. As shown, a single device 104 may interface with multiple licensing servers 154A and 154B, but typically interfaces with only one device management server 154C.

Figure 2:
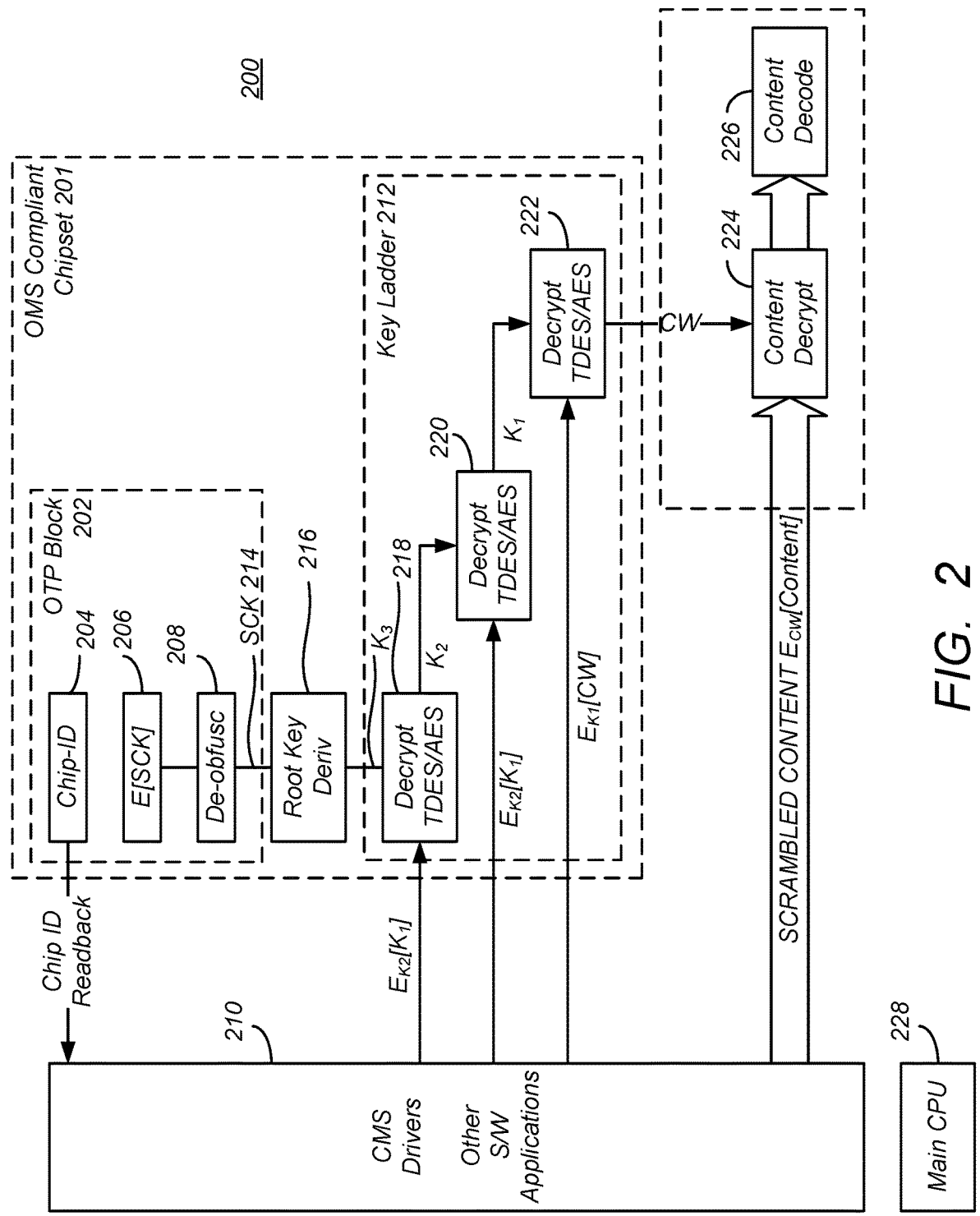
FIG. 2 is a diagram of an exemplary system using a symmetric key ladder.

FIG. 2 is a diagram of an exemplary system using a symmetric key ladder. The exemplary key ladder is defined in the standard ANIS/SCTE 201 2013 (Open Media Security (OMS) Root Key Derivation Profiles and Test Vectors). The OMS-compliant system 200 includes main CPU 228 for performing non-secure operations of the device 104, and an OMS compliant chipset 201 having an OTP block 202. The OMS compliant chipset 201 implements a key ladder 212 that generates a key (in the illustrated example, a control word (CW) that is used to decrypt or descramble content that has been encrypted by the CW ($E_{CW}$(Content)) from a root key.

The illustrated OMS-compliant system 200 uses a single chip-unique key called a secret chip key (SCK) 214. The SCK 214 is provided by an OTP block 202 having a chip identifier or chip ID 204 stored in the OTP block 202. The chip ID 204 is read from the OTP block 202 by the OMS drivers 210 and checked using a file consistency check. The encrypted or otherwise obfuscated SCK (ESCK) 206 associated with the chip ID 204 is decrypted or deobfuscated by deobfuscation module 208 to generate the SCK 214. A root key derivator 216 derives a key root key ($K_3$) from the SCK 214 and a vendor identifier or vendor ID. Hence, the root key $K_3$ is specific to one conditional access system (CAS) vendor. Multiple encrypted key values ($EK_3(K_2)$, $EK_2(K_1)$, and $EK_1(CW)$) inserted into subsequent stages of the key ladder 212, as performed by respective decryptor modules 218, 220 and 222 until a CW (Control Word) is derived. The CW is used by content descrambler 224 to decrypt encrypted digital content $E_{CW}$(Content) to provide clear content that is decoded by content decoder 226.

The derivation functions in a symmetric key ladder (e.g. the decryption functions performed in modules 218, 220 and 222) is only one-way (using a cryptographic hash function like SHA256 or SHA3-256) or it cannot be reversed without a secret key value protected in hardware.

Derived keys (e.g. keys $K_2$, $K_3$, and CW) are limited in scope and shared with a specific headend/infrastructure entity that has the need to know these derived per-chip keys in order to implement the CAS. For example, $K_3$ in the OMS key ladder 212 is derived for a specific Vendor ID=$Vendor_i$. A root of trust that has the values of all of the top-level per-chip keys derives and then shares $K_3(Vendor_i)$ with a specific CAS vendor. Since a CAS vendor does not possess SCK 214 or any other keys above $K_3$ in the key ladder 212—the CAS vendor cannot go backwards up the key ladder 212 and cannot determine the $K_3$ keys of any other CAS vendor.

Figure 3:
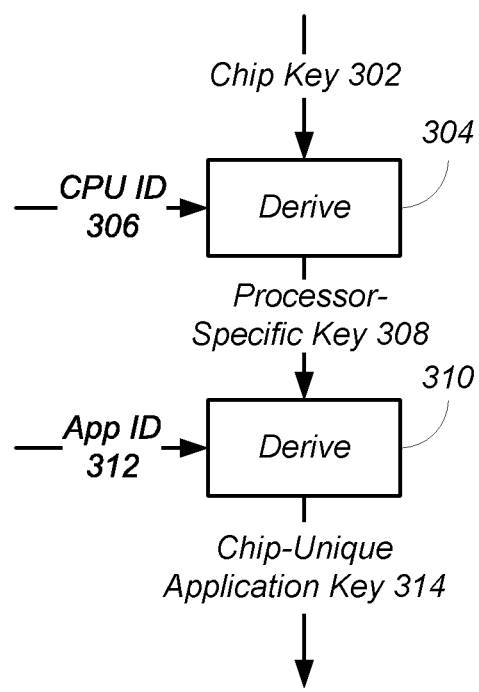
FIG. 3 is a diagram illustrating one example of a symmetric key ladder.

Symmetric key ladders 212 can also derive symmetric keys utilized by different applications. FIG. 3 is a diagram illustrating one example of a symmetric key ladder. A single chip 201 may include a plurality of processors such as a video processor, audio processor, general-purpose host CPU and/or security processor. The single chip 201 may include a unique per-chip key (e.g. a key uniquely associated with a particular chip, hereinafter alternatively referred to as the chip key) 302, but multiple processors within that chip.

Block 304 implements a derivation process in which the chip key 302 and a CPU identifier (CPU_ID 306) is used to derive a processor-specific key 308. The processor-specific key 308 is a key used in connection with a specific processor within the single chip 201.

Further, a processor within the chip 201 may be used to execute a plurality of applications. Module 310 implements a process in which the processor specific key 308 and an application identifier (App_ID 312) is used to derive a chip-unique application key 314. Application examples can for example include transport layer security, or TLS (utilizing symmetric per-shared keys), internet key exchange or IKE (with symmetric pre-shared keys), a Digital Rights Management (DRM) System or a CAS. Chip hardware may derive a different key for each application, and an external server (such as a digital rights management or DRM Licensing Server) communicating with a specific application executed by a processor of the chip would be provided with a database of application-specific keys for each chip. If the application specific keys available to the server are compromised, all per-device keys corresponding to that specific application are also compromised. However, per-device keys for other applications may still be safe.

There are examples of key ladders that are rooted in a device public key. For example, U.S. Pat. No. 8,364,964 entitled "Registering Devices with a Registration Server" (hereby incorporated by reference herein) discloses a key ladder that begins with a device public key, while the rest of the key hierarchy consists of symmetric keys. In that example, each device has a unique Elliptic Curve Diffie-Hellman (ECDH) public key that is utilized by a server along with server's ECDH private key to generate a unique symmetric key for each device. This device symmetric key can then be used to deliver additional keys to a device.

Such key ladders have the advantage that a server (e.g., Conditional Access or DRM server) can be configured with a database of device public keys rather than device secret symmetric keys. If those public keys are disclosed, no secret information about each device will be disclosed.

However, when a single device runs multiple secure applications (e.g., multiple CAS or DRM systems), each of those applications requires its own public key. The device will need secure storage for multiple public keys. This requires additional storage. Such considerations can limit the number of applications permissible in some devices. Even if the device has a large amount of total storage—the amount of secure hardware-protected secure storage is typically significantly more limited. For example, the only secure storage of the device may be OTP (One Time Programmable) memory consisting of a set of fuses that are blown during device manufacture. In most cases, there is insufficient space on the device to store a separate public/ private keypair for every application.

Key Ladder Producing Device Public Key

Figure 4:
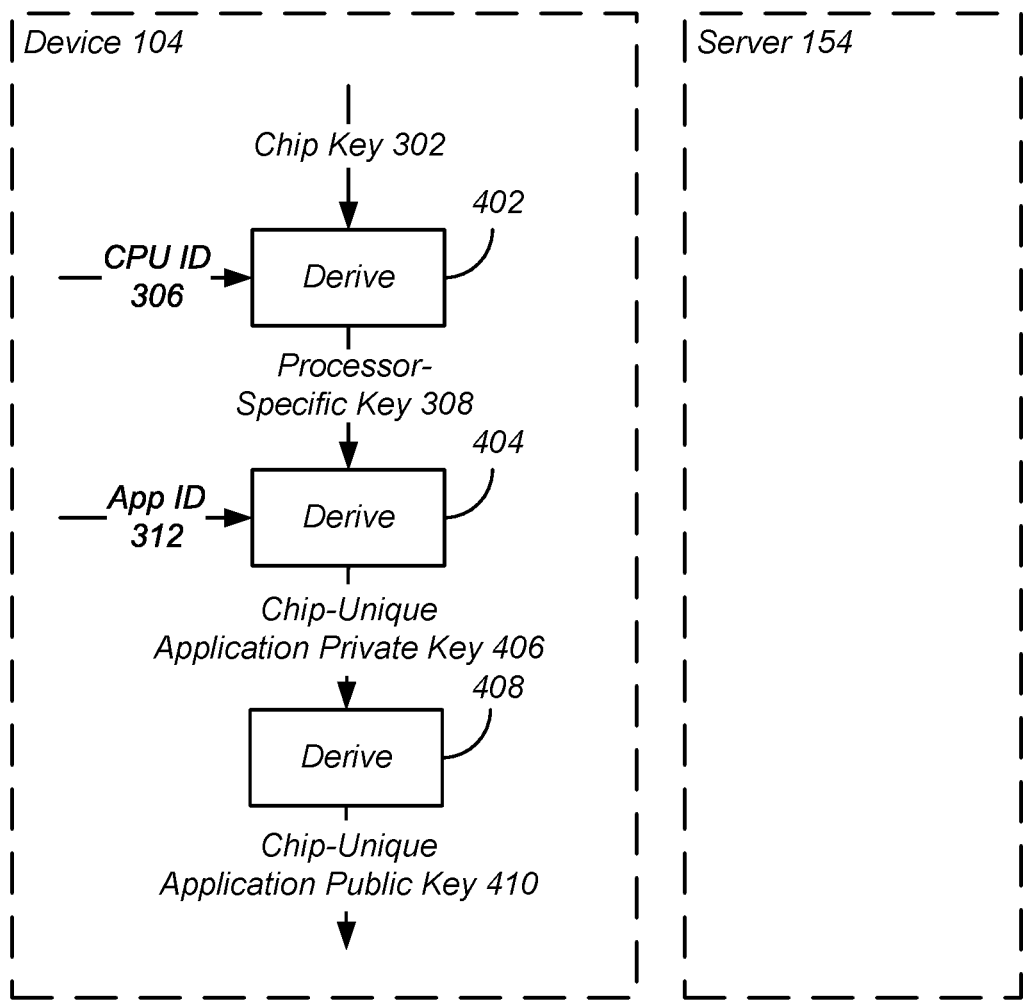
FIG. 4 is a diagram illustrating a key ladder implemented in a device where the final derived key is a device public key

FIG. 4 is a diagram illustrating a key ladder implemented in a device 104 where the final derived key is a device public key. A processor-specific symmetric key for the device 104 (hereinafter "second processor specific first device symmetric key 308) is generated in the device 104 from a first processor specific-first device symmetric key and a first identifier. In the illustrated embodiment, this is accomplished by a first derivation module 402 implemented in the device 104 using a chip key 302 as the first processor specific first device symmetric key and the CPU_ID 306 as the first identifier. The device 104 then generates a chip-unique application private key 406 for the first device (hereinafter alternatively referred to as the chip-unique first device application private key (CUAPrK)) from a second identifier and the generated second processor-specific first device symmetric key 308. In the illustrated embodiment, the second identifier is an application identifier or App_ID 312. This is implemented by a second derivation module 404 in the device 104. Finally, a third derivation module 408 generates a chip unique first device application public key (hereinafter alternatively referred to as CUAPuK) 410 from the first device CUAPrK 406.

The first two derivation processes (of modules 402 and 404) are only an example. The chip key 302 is a unique symmetric per-chip key, and the derived processor specific key 308 is also a symmetric key. Further, there can be any number of additional key derivation steps between the generation of processor-specific key 308 and the chip-unique application private key CUAPrK 406. However, unlike existing art, the application-specific key (e.g. the chip-unique application private key) is an asymmetric private key. For example, the CUAPrK 406 may be an Elliptic Curve Diffie-Hellman (ECDH) private key, an Elliptic Curve Digital Signature Algorithm (ECDSA) private key, a Diffie-Hellman private key, or an El Gamal private key. This derivation works for any such discrete log-based cryptographic system because in all such cases the private key can be a random or pseudo-random value.

Often in such crypto systems the private key must be bounded. For example in the case of Diffie-Hellman the private key (in our case, the CUAPrK 406) must be less than the value of a large prime number p. To assure that the derived private key is not too large, a result of key derivation of a K can be used to compute K'=K mod p and utilize K' is the Chip-Unique Application Private Key (CUAPrK). Hence, referring back to FIG. 4, if the result of the derivation process 404 is key K, the CUAPrK 406 may be determined to be K'=K mod p.

In all discrete log-based crypto systems, CUAPrK and a set of fixed group parameters can be utilized to derive the corresponding Chip-Unique Application Public Key (CUAPuK). For example, in the case of Diffie-Hellman:

$$CUAPuK = g^{CUAPrK} \bmod p \qquad \text{Equation (1)}$$

Where g is called group generator and p is a large prime that should be 2048 bits or larger. Similarly, in the case of both ECDH and ECDSA we have:

$$CUAPuK = CUAPrK * G \qquad \text{Equation (2)}$$

Where G is an Elliptic Curve base point and operation '*' is a special version of multiplication defined for Elliptic Curves.

Using the foregoing techniques, the public key CUAPuK 410 is computed from the device private key CUAPrK and the (application-specific) value of CUAPuK 410 (along with a unique device or chip identifier CPU_ID 306) is provided to a specific application server 154B. CUAPuK 410 can also be included in a digital certificate (e.g., X.509 device certificate) signed by a trusted Certificate Authority (CA).

This technique is particularly useful for devices with limited secure storage, as the device 104 itself does not need to store a plurality of public keys for each application. However a signed digital certificate doesn't need to be kept secret (as it does not include private keys) and there may be sufficient non-secure storage in the device 104 to store multiple digital certificates. Alternatively, these digital certificates can be published in a directory outside of each device 104.

The application server 154B can perform a variety of cryptographic tasks to support communication and operation with the device 104. Other than data and instructions stored by or available to the server 154, only the CUAPuK 410 (and associated CPU_ID 306 and/or App_ID 312), the application server 154B) are required for such cryptographic tasks.

Computation of a Symmetric Key K

For example, to compute a symmetric key K for communicating private data or messages with the device 104, the only information needed from the device 104 is the CUAPuK 410 of the device 104 and related application. This can be accomplished using the (known) server's private key SrvPuKey.

For example, such a computation can be done on the server 154 using Diffie-Hellman key agreement:

$$K = \text{CUAPuK}^{SrvPrKey} \bmod p \quad \text{Equation (3)}$$

Where SrvPrKey is the server's private key. The client device 104 would compute the same K using:

$$K = \text{SrvPuKey}^{CUAPrK} \bmod p \quad \text{Equation (4)}$$

Or, the computation can be accomplished by the server 154 using the ECDH key agreement, the symmetric key can be computed as:

$$K = \text{SrvPrKey} * \text{CUAPuK} \quad \text{Equation (5)}$$

The client device would compute the same K using K=CUAPrK*SrvPuKey.

Encryption of Messages Using the Device's Public Key

Alternatively, the server 154 can directly encrypt a short message such as another key sent to the device using CUAPuK. This is applicable for some discrete log-based encryption algorithms such as El Gamal.

Verify Signatures

The server 154 can verify a signature generated inside the device 104 using CUAPrK 406 with the corresponding device public key CUAPuK 410. The applies, for example, to devices 104 generating ECDSA signatures using an Elliptic Curve Digital Signature Algorithm (ECDSA) private key derived using the key ladder of FIG. 4.

Providing CUAPuK to Application Servers

The CUAPuK 410 may be provided from to the server 154 from each device 104 directly, or in a list having the associated CUAPuK 410 for each of the plurality of devices 104. Alternatively, instead of providing a list of application-specific device public keys CUAPuK 410 to an application server 154B, a list of CSR (Certificate Signing Request) files can be provided to a CA. A commonly used CSR format is PKCS #10 and it includes the public key, certificate subject name and a signature with the corresponding private key (to prove possession of the private key). Certificate subject name would normally include a device or chip serial number or some other type of a device identifier.

CSR files can be collected in the factory where the device 104 is manufactured, extracted from a device 104 in the field, or pre-generated along with the public/private key pair in a secure offline system.

After CSR files are submitted to a Certificate Authority (CA), the CA issues corresponding application-specific device certificates which are stored in a separate certificate directory, provisioned into each corresponding device 104 (in the factory or in the field) or both. Device certificates signed by a trusted CA are used to validate the identity of the device 104 which is included in the certificate subject name.

In all the above cases, a permanent secret or private key of the device 104 is not exposed on the server 154. In the cases of key agreement algorithms (e.g., DH and ECDH), the derived shared key could be exposed on a server that has been compromised. In that case, a replacement to the compromised server 154B is provisioned with a new server public/private key pair SrvPuKey' and SrvPrKey' which would result in a completely new set of per-device symmetric keys K derived through key agreement.

Unlike key ladders rooted in a device public key (in which a plurality of application-specific public keys must be computed and stored), the device public/private key pairs (CUAPuK, CUAPrK) are derived from a single chip key 302 value, and can be derived when needed instead of stored. Consequently, only a very small amount of secure memory in the device is sufficient for all the applications.

The key ladder presented in FIG. 4 begins with a unique symmetric chip key 302. That unique symmetric key is not shared with any application server 154B since it is symmetric and could be compromised if the server 154 were to be compromised. In some circumstances, in addition to the application-specific server 154B, it is advantageous to provide for a general purpose device management server that is able to derive any of the keys associated with the device 104, including all of the keys in the key ladder, including the root key used to derive the processor specific key 308, chip unique application private key CUAPrK 406, and the CUAPuK 410. For example, such a general purpose device management server may be a server utilized during development to emulate all possible applications that talk to that one device 104.

Figure 5:
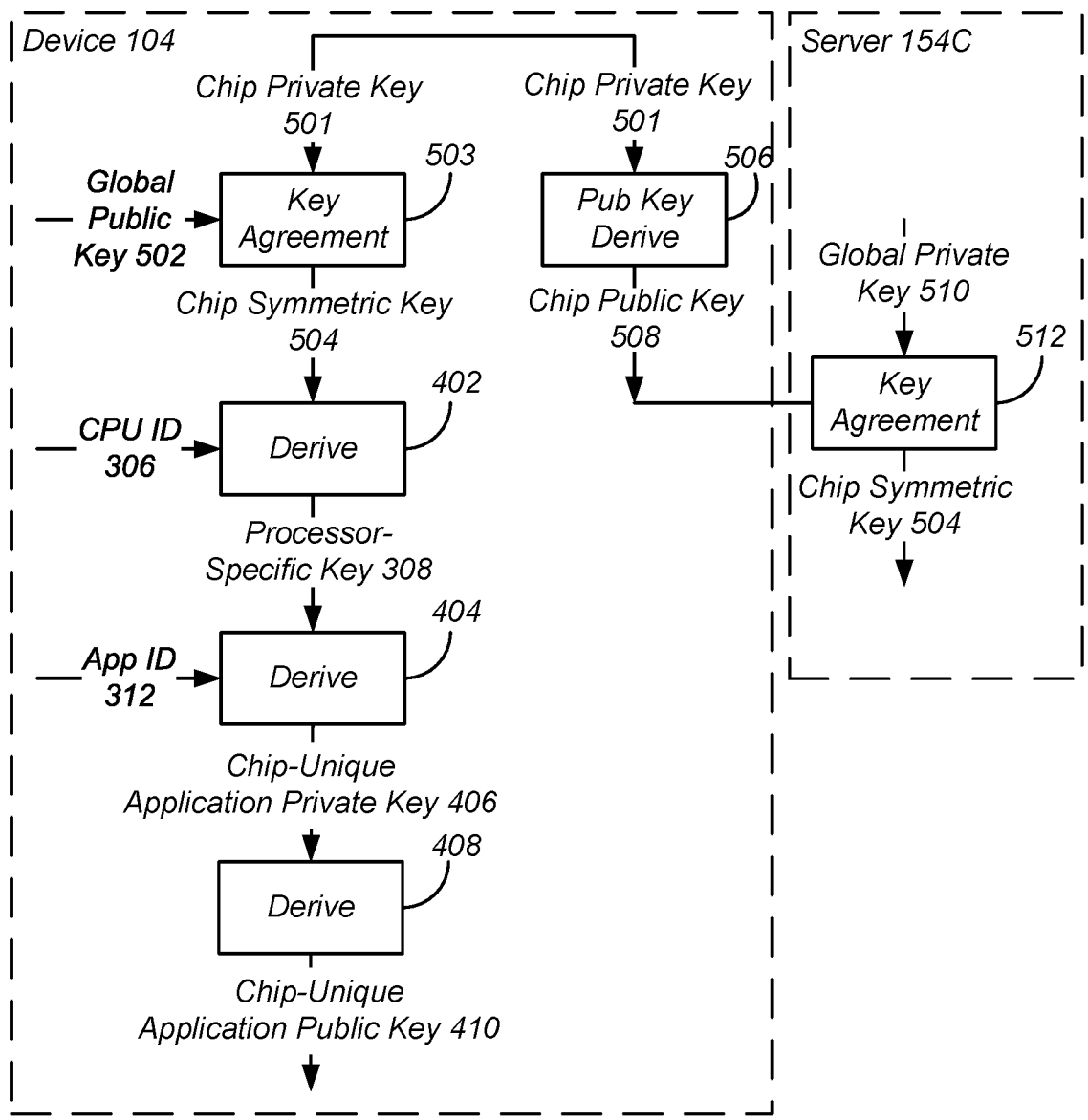
FIG. 5 is a diagram of another embodiment of a key ladder implemented in a device where the final derived key is a device public key.

FIG. 5 is a diagram of another embodiment of a key ladder implemented in a device 104 where the final derived key is a device public key. The embodiment illustrated in FIG. 4 begins with a unique symmetric chip key 302. That unique symmetric chip key 302 is not shared with any application server 154B because it is symmetric and could be compromised if the server 154 is compromised. However, in addition to application specific servers 154B, there may be one or more general-purpose device management servers 154C that need to be able to derive any key associated with a device 104, including keys within the ladder (e.g. processor specific key 308, CUAPrK 406 and CUAPuK 410. Such a server 154 may, for example, be utilized during development to emulate all possible applications that talk to that one device 104.

In the embodiment shown in FIG. 5, the device 104 begins with a chip private Key 501 (instead of a symmetric Chip Key 302) and a key agreement module 502 implements an algorithm such as DH or ECDH) to use a Global Public Key 502 of the management server 154C to derive Chip Symmetric Key 504. The device 104 then uses the chip symmetric key 504 in the key ladder to derive the processor-specific key 308 and the chip-unique application private key 306 as described in FIG. 3. As was the case, with the system shown in FIG. 4, there is still a key pair (CUAPuK 410, CUAPrK 406) derived for a specific application (identified by App_ID 312 within a device 104 and a database of CUAPuK 410 values can be shared with a specific application server 154B.

In addition, the device 104 uses public key generation module 506 to derive a chip public key 508 from the corresponding chip private key 501. This chip public key 508 (and associated CPU_ID 306) can be provided to the server 154, where the chip public key 501 and corresponding CPU_ID 206 are stored. The server 154 can then use its own global private key 510 and the chip public key 508 to derive a chip symmetric key 504 for the device 104. The server 154 can then use the chip symmetric key 504 can and the CPU_ID 306 and App_ID 212 to derive all of the (CUAPuK 410, CUAPrK 406) key pairs for every application that can execute on the device 104.

This process can be performed for a plurality of devices 104, thus generating a database of chip public keys 508 and chip symmetric keys 504, and (CUAPuK 410, CUAPrK 406) key pairs, each linked with the CPU_ID 306 and App_ID 312 of the associated device 104.

Compromise of such a server 154 (e.g. management server 154C) computing the chip symmetric key 504 and (CUAPuK 410, CUAPrK 406) key pairs can be much more difficult to recover from than a compromise of an application-specific server 154B that has a database of CUAPuKs 410 for one specific Application ID 312, since new keys must be computed for each application supported on each of the device(s) 104.

For example, if the management server 154C is compromised, a new keypair (global public key 502, global private key 510) must be randomly generated on a replacement for the compromised management server 154C. The resulting global public key 502 must be provided to the device 104, which uses the new global public key 502 to derive new set of (CUAPuK 410, CUAPrK 406) key pairs. Further, each device will need to compute and distribute application-specific CUAPuK 410 values to each application server 154B. Also, the chip public key 508 of each device 104 must be used to regenerate the chip symmetric key 504 from the new global private key 510 using key agreement module 512, to be used in securely communicate with the device 104. Finally, the recomputed chip symmetric key 504 may be used to rederive all of the (CUAPuK 410, CUAPrK 406) key pairs for every application that can execute on the device 104. This may not be necessary in all cases, but as described above, such intermediate keys (the processor specific key 308 and the CUAPrK 406) may be useful for debugging purposes.

Since new keys must be computed for each application stored on each of the device(s), it is preferred that the management server 154C be more secure than an application server 154B and sufficiently secure that it can be trusted with all the derived public keys of each device 104.

Figure 6:
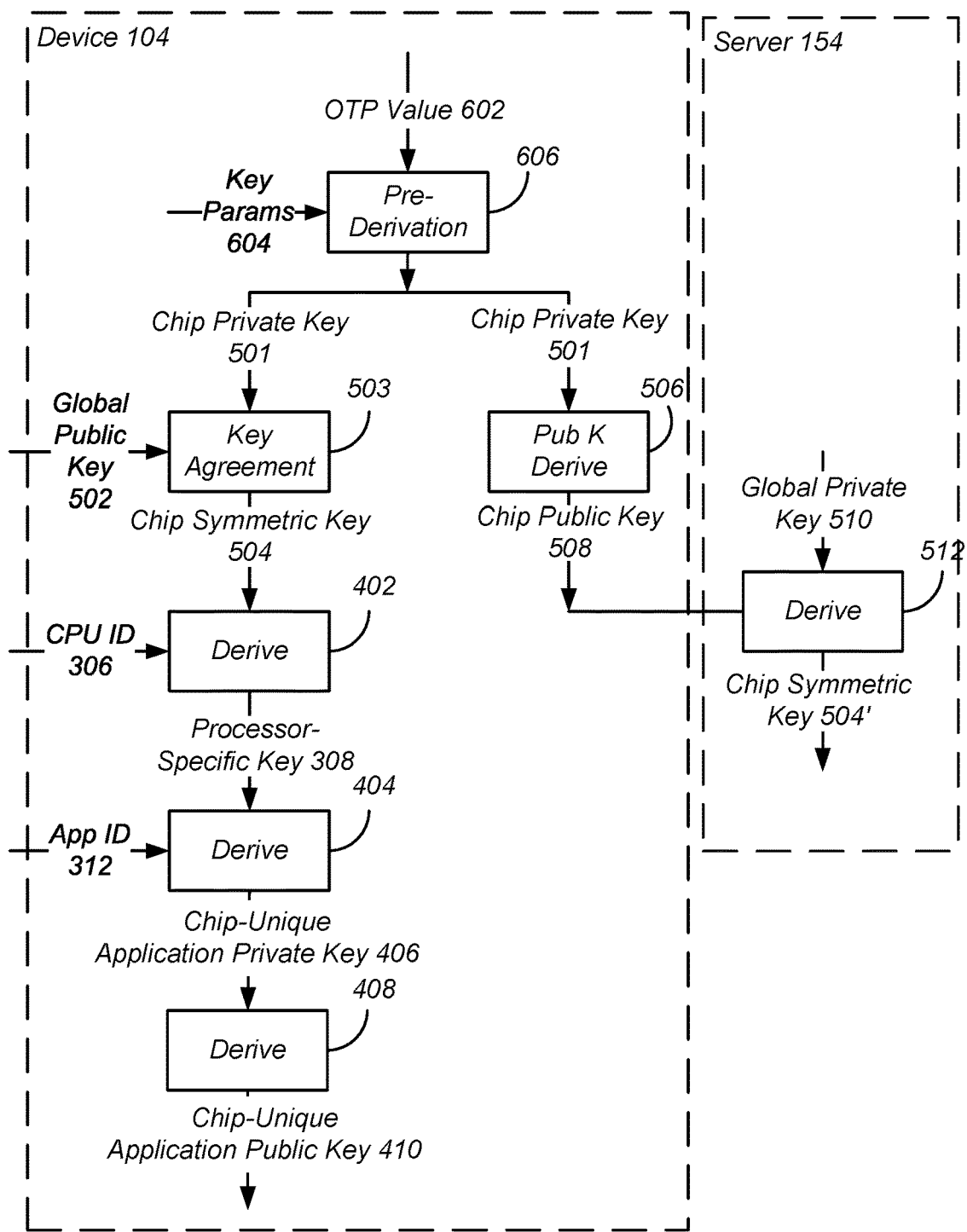
FIG. 6 is a diagram of another embodiment of still another key ladder implemented in a device where the final derived key is a device public key.

FIG. 6 is a diagram of another embodiment of still another key ladder implemented in a device 104 where the final derived key is a device public key 410. In this embodiment includes additional derivation operations to generate the chip private key 501. In this embodiment, a pre-derivation module 606 of the device 104 uses an OTP value 602 stored in secure OTP memory (e.g. in OTP block 202) and key parameters 604 to derive the chip private key 501. As one of many possible examples, the "Key Parameters" field specifies the public key algorithm such as DH vs. ECDH along with a specific DH group (p,g) or a specific Elliptic Curve. This allows the same chip to be utilized with different public key algorithms, selected based on the server capabilities.

Figure 7:
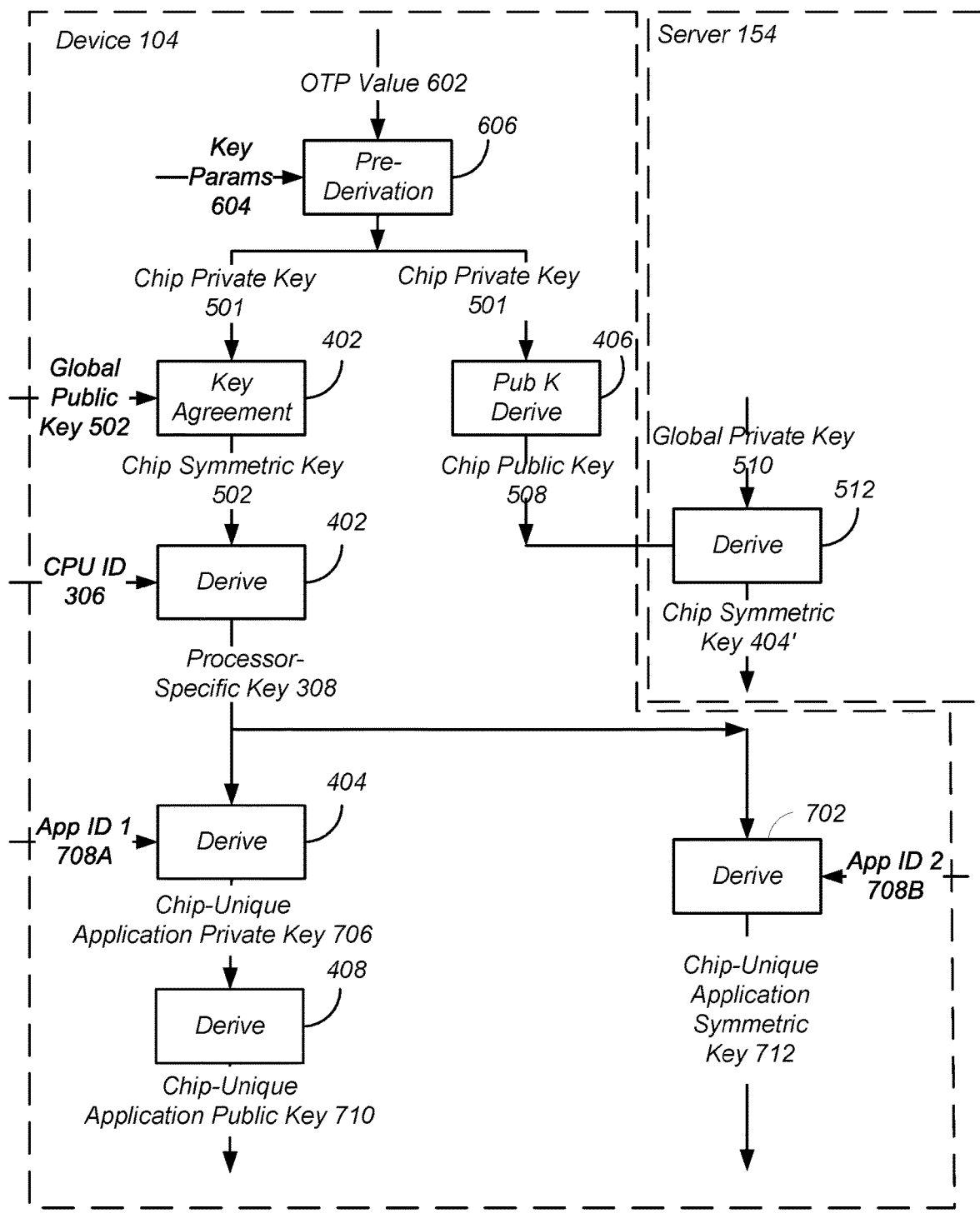
FIG. 7 is a diagram illustrating an embodiment of the key ladder used to derive both symmetric and public/private device keys.

Analogous key ladder principles can be used by the device 104 and/or server 154 to derive both symmetric and public/private device keys. FIG. 7 is a diagram illustrating such an embodiment of the key ladder. This embodiment is analogous to the embodiment illustrated in FIG. 6, but in this embodiment, the processor-specific key 308 is used by derivation module 404 to generate a CUAPrK 706 (e.g., ECDSA or ECDH private key) as well as an associated chip unique application public key (CUAPuK) 710 based on a first application identifier (App ID1 708A) and also is used by derive module 702 to derive a different Chip-Unique Symmetric Key (e.g., AES-128 key) 712 based on a second application identifier (App ID2 708B). Thus, the same key ladder that starts with a single device root key (OTP value 602) may be utilized to generate both public/private keys (CUAPrK 706 and CUAPuK 710) and symmetric key 712 as well as keys used with different cryptographic systems (Diffie-Hellman, El Gamal, ECDSA and ECDH using different Elliptic Curves, AES, Blowfish, HMAC-SHA256, etc.).

Public keys may be generally preferable when they have to be exposed to an application outside of the device 104. But the same key ladder may also be used to generate only locally utilized keys inside the device. For example, the key ladder may be used to generate a key for encrypted flash storage in that same device—that key can be symmetric for faster performance and will never need to be exported outside of that one device.

Figure 8:
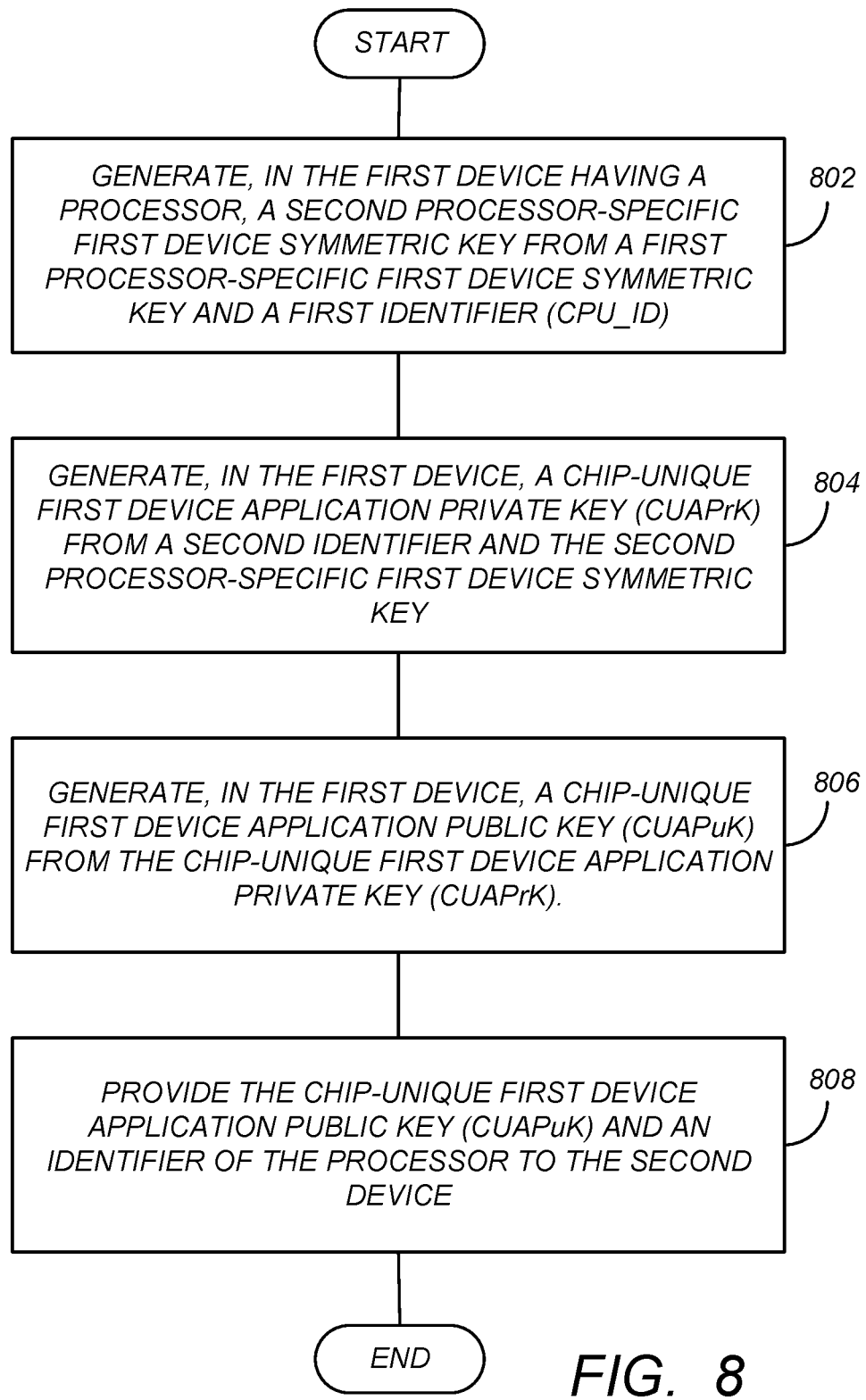
FIG. 8 is a diagram illustrating exemplary process steps that can be used to generate a key ladder for communicating between a first device and a second device.

FIG. 8 is a diagram illustrating exemplary process steps that can be used to generate a key ladder for communicating between a first device 104 such as a client device and a second device such as a server 154. In block 802, a second processor specific first device symmetric key such as processor specific key 308 is generated from a first processor-specific first device key such as chip key 302 and a first identifier such as processor identifier CPU_ID 306. In block 804, a chip-unique first device application private key (such as CUAPrK) 406 is generated from a second identifier such as the application identifier App_ID 312 and the processor specific first device symmetric key 308. In block 806 a chip-unique first device application specific public key (CUAPuK) 410 is generated from the chip unique first device application private key CUAPrK 406. The chip unique first device application public key CUAPuK 410 may then be transmitted to a second device such as server 154, as shown in block 808. Alternatively, the CUAPuK 410 may be provided to the second device via a digital certificate by a certificate authority.

Figure 9:
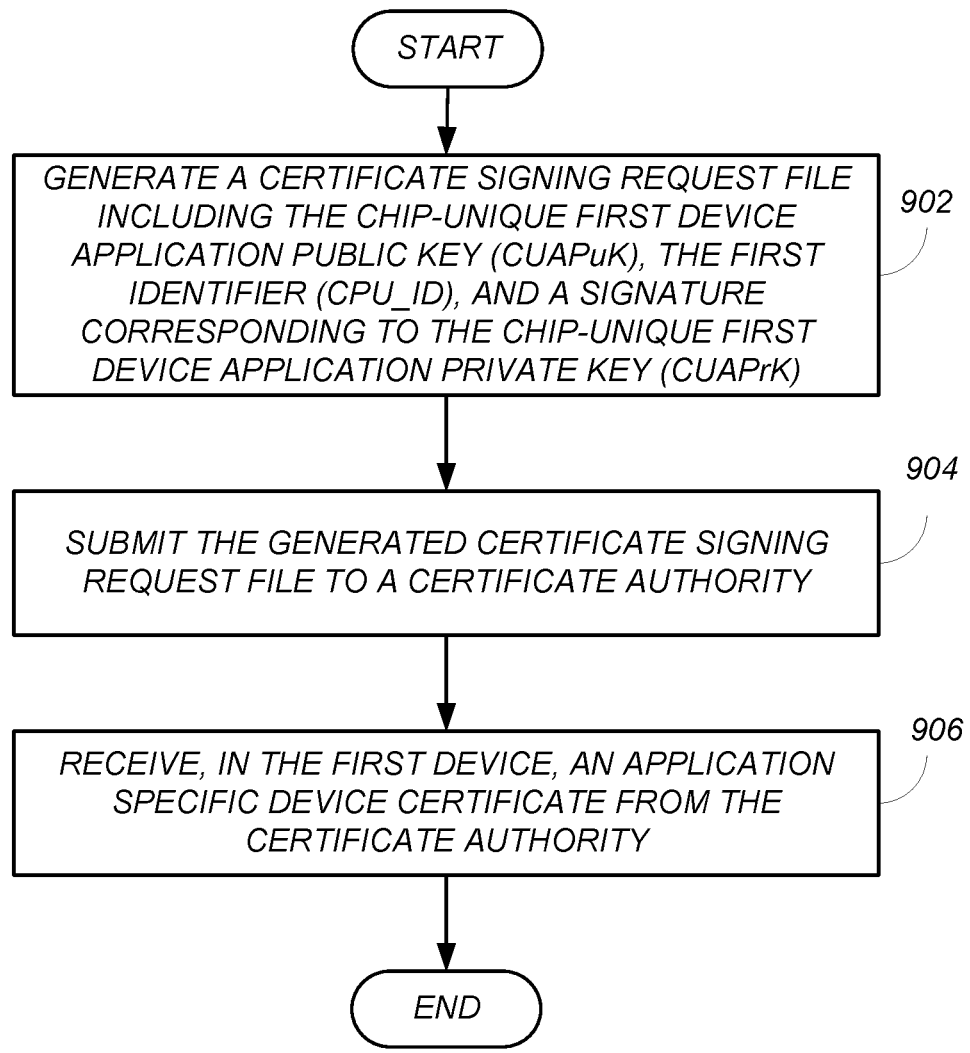
FIG. 9 is a diagram presenting exemplary operations used to provide the chip-unique first device application public key to the second device via a digital certificate by a certificate authority.

FIG. 9 is a diagram presenting exemplary operations used to provide the CUAPuK 410 to the second device via a digital certificate by a certificate authority. In this embodiment, the first device 104 generates a certificate signing request file including the chip unique first device application public key (CUAPuK) 410, the first device identifier (CPU_ID) and a signature corresponding to the CUAPuK 410, as shown in block 902. The generated certificate signing request file is submitted to a certificate authority, and the first device receives an application specific device certificate having the CUAPuK 410 from the certificate authority, as shown in blocks 904 and 906, respectively.

Figure 10:
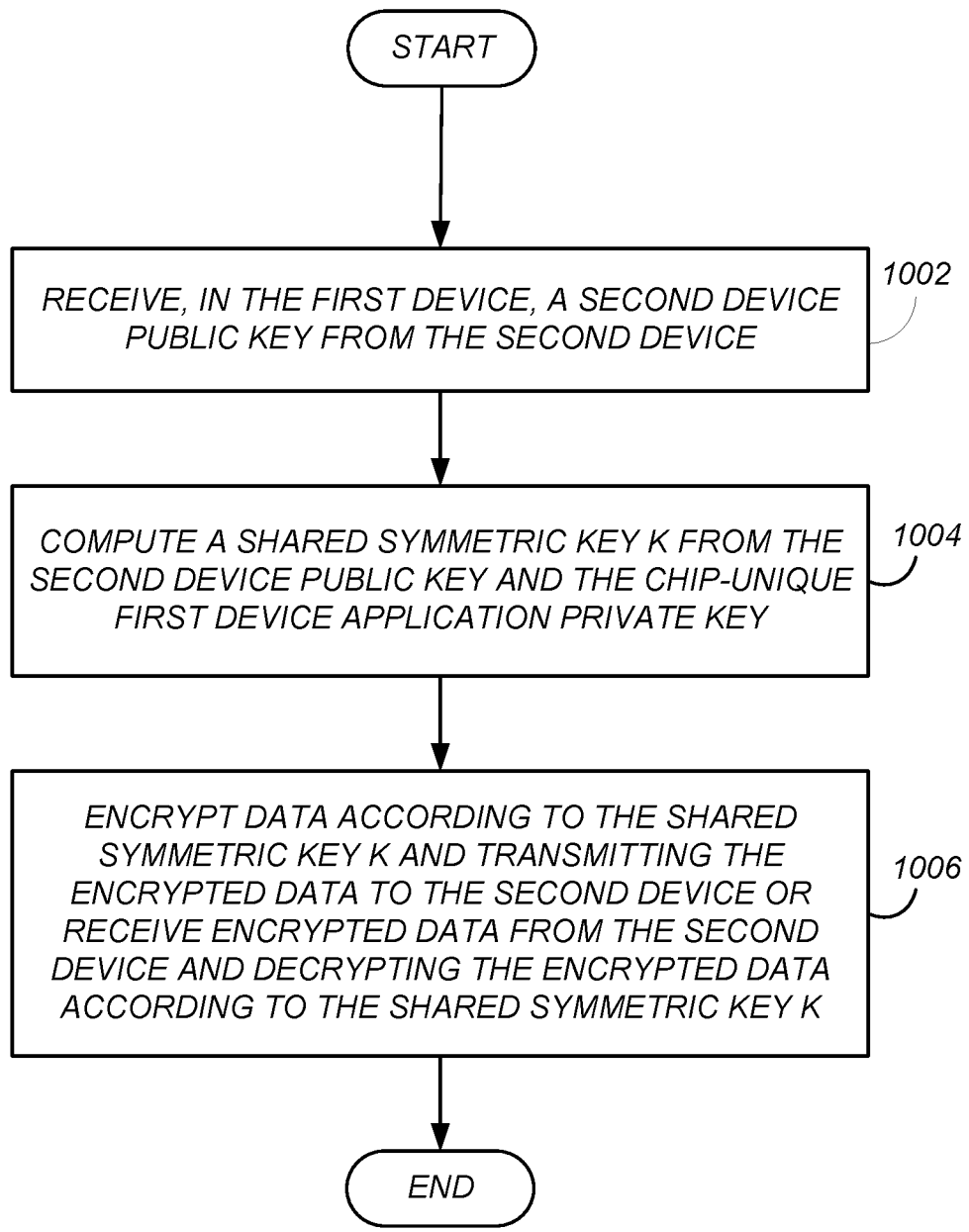
FIG. 10 is a diagram illustrating exemplary process steps that can be used by the transmitting and receiving devices to compute a symmetric shared key K from their respective private/public key pairs.

Communications may be performed between the first device and second device by encrypting messages from the transmitting with the receiving device's public key, with the receiving device able to decrypt the messages using the receiving device's private key. However, such encryption and decryption can be computationally intensive. Encrypting and decrypting information using a symmetric key K shared between the transmitting device and the receiving device is less computationally intensive, and is therefore preferred for some communications. To accomplish this, the transmitting and receiving devices may compute the symmetric shared key K from their respective private/public key pairs, as shown in FIG. 10.

In this embodiment, the second device (e.g. server 154) has computed its own private/public key pair that includes a second device public key and a second device private key. In block 1002, the first device (e.g. device 104) receives this computed second device public key from the second device, and in bock 1004, computes a shared symmetric key K from the second device public key and the private key of the first device (e.g. the CUAPuK). The second device likewise accepts the first device public key and computes the same shared symmetric key K from the first device public key and the private key of the second device. At this point, data can be communicated between the first device and the second device by the transmitting device encrypting the messages with the symmetric key K, and the receiving device decrypting the messages with the same symmetric key K. This is indicated by block 1006, in which the data is encrypted by the first device according to the shared symmetric key K and transmitted to the second device for decryption, or in which the first device receives encrypted data from the second device and decrypts the data using the shared symmetric key K.

In the embodiment shown in FIG. 4, the processor specific first device symmetric key is the processor specific key 308, and this key is generated from a chip key 302 and an identifier of the processor (CPU_ID).

In the embodiment illustrated in FIGS. 5 and 6, the processor-specific symmetric key is the chip symmetric key 504 and is generated from a chip private key 501 and a global public key 502 of the second device using key agreement module 503. Generating the processor-specific symmetric key 504 from a chip private key 501 permits a remote device such as the device management server 154C to reproduce the same key used as an input to the key ladder in the device 104. In FIG. 5, this is accomplished by the first device further generating a chip public key 508 from the chip private key 501, and providing the chip public key 508 to the second device or device management server 154C, which may be accomplished via removable media ("sneakernet") or via electronic message. The device management server 154C then computes its equivalent version the chip symmetric key 504 from the management server's global private key 510 associated with the global public key 502, using a key agreement module 512. As the management server 154C is aware of the CPU_ID 306, App_ID 312 and is aware of the algorithms used in derive modules 402, 404, and 408, the management server 154C can now use the chip symmetric key 504 to reproduce the keys in the key ladder, or the processor specific key 308, the CUAPrK 406 and the CUAPuK 410. Should the management server be compromised, the management server 154C generates a new global private key 510, and an associated new global public key 502, and transmits that new global public key 502 to the device 104. The device 104 recites that new global public key 502 and uses it to derive a new chip symmetric key 504, which is then used to generate new keys in the key ladder (e.g. processor specific key 308, CUAPrK 406 and CUAPuK 410). The management server 154C then generates a new chip symmetric key 504, and can then independently derive the keys of the key ladder.

Hardware Environment

Figure 11:
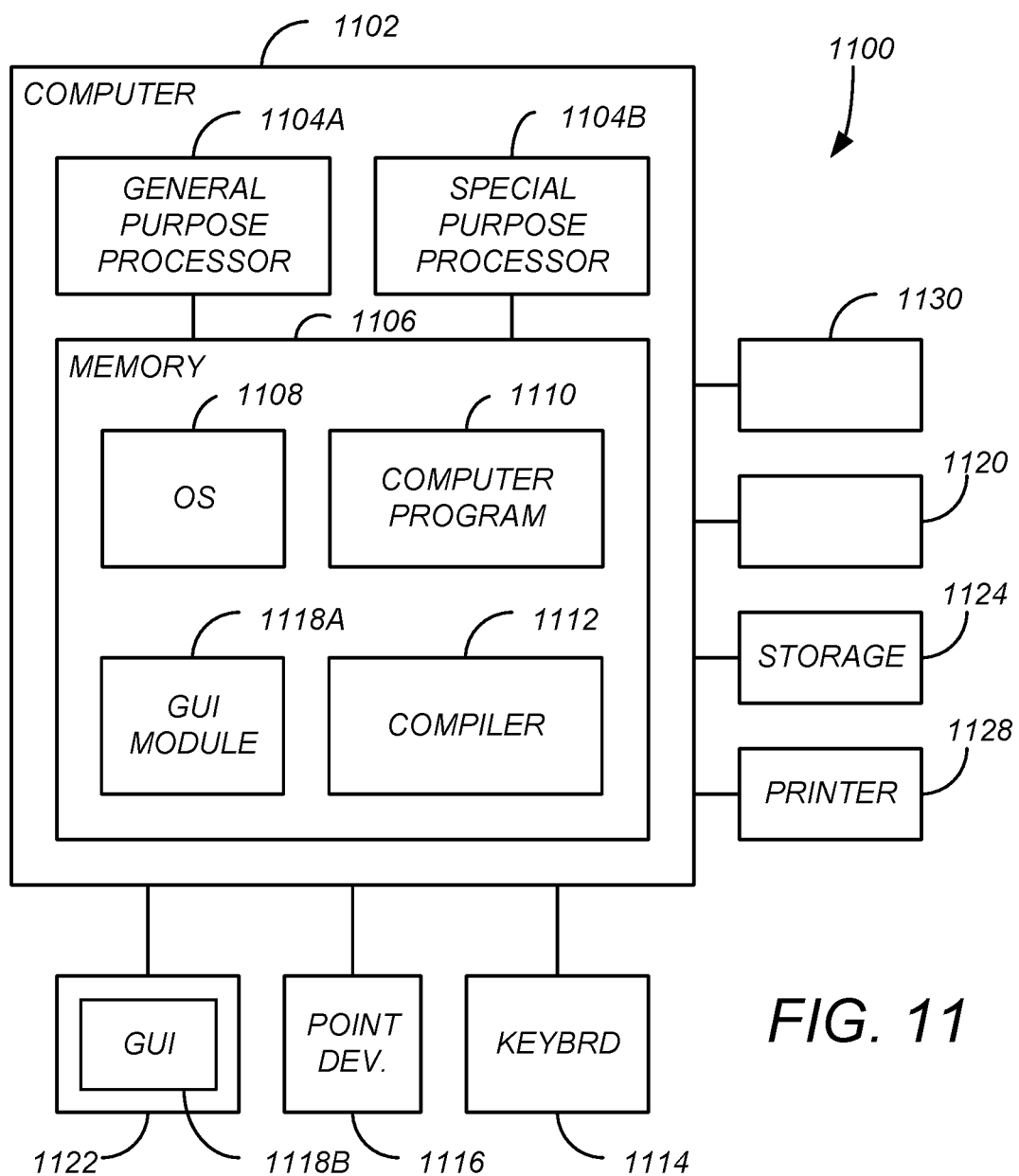
FIG. 11 illustrates an exemplary computer system that could be used to implement processing elements.

FIG. 11 illustrates an exemplary computer system 1100 that could be used to implement processing elements of the above disclosure, including the any of the devices 104 and/or servers 154. The computer 1102 comprises a processor 1104 and a memory, such as random access memory (RAM) 1106. The computer 1102 is operatively coupled to a display 1122, which presents images such as windows to the user on a graphical user interface 1118B. The computer 1102 may be coupled to other devices, such as a keyboard 1114, a mouse device 1116, a printer 1128, etc. Of course, those skilled in the art will recognize that any combination of the above components, or any number of different components, peripherals, and other devices, may be used with the computer 1102.

Generally, the computer 1102 operates under control of an operating system 1108 stored in the memory 1106, and interfaces with the user to accept inputs and commands and to present results through a graphical user interface (GUI) module 1118A. Although the GUI module 1118B is depicted as a separate module, the instructions performing the GUI functions can be resident or distributed in the operating system 1108, the computer program 1110, or implemented with special purpose memory and processors. The computer 1102 also implements a compiler 1112 which allows an application program 1110 written in a programming language such as COBOL, C++, FORTRAN, or other language to be translated into processor 1104 readable code. After completion, the application 1110 accesses and manipulates data stored in the memory 1106 of the computer 1102 using the relationships and logic that was generated using the compiler 1112. The computer 1102 also optionally comprises an external communication device such as a modem, satellite link, Ethernet card, or other device for communicating with other computers.

In one embodiment, instructions implementing the operating system 1108, the computer program 1110, and the compiler 1112 are tangibly embodied in a computer-readable medium, e.g., data storage device 1120, which could include one or more fixed or removable data storage devices, such as a zip drive, floppy disc drive 1124, hard drive, CD-ROM drive, tape drive, etc. Further, the operating system 1108 and the computer program 1110 are comprised of instructions which, when read and executed by the computer 1102, causes the computer 1102 to perform the operations herein described. Computer program 1110 and/or operating instructions may also be tangibly embodied in memory 1106 and/or data communications devices 1130, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

What is claimed is:

1. A method of generating a key ladder for securely communicating between a first device and a second device, comprising:
   generating, in the first device having a processor, a second processor-specific first device symmetric key from a first processor-specific first device symmetric key and a first identifier;
   generating, in the first device, a chip-unique first device application private key from a second identifier and the second processor-specific first device symmetric key; and generating, in the first device, a chip-unique first device application public key from the chip-unique first device application private key.

2. The method of claim 1, further comprising providing the chip-unique first device application public key and an identifier of the processor to the second device.

3. The method of claim 1, further comprising:
generating a certificate signing request file including the chip-unique first device application public key, the first identifier, and a signature corresponding to the chip-unique first device application private key;
submitting the generated certificate signing request file to a certificate authority; and
receiving, in the first device, an application specific device certificate from the certificate authority.

4. The method of claim 1, wherein the chip-unique first device application private key is generated according to a discrete log-based cryptographic algorithm.

5. The method of claim 4, wherein the discrete log-based cryptographic algorithm is a Diffie-Hellman, and the chip-unique first device application public key (CUAPuK) is computed as $CUAPuK = g^{CuaPrK} \mod p$, where g is a group generator and p is a prime number of at least 2048 bits.

6. The method of claim 4, wherein the discrete log-based cryptographic algorithm is one of elliptic curve Diffie-Hellman and elliptic curve digital signature algorithm and the chip-unique first device application public key (CUAPuK) is computed as $CUAPuK = CUAPrK*G$ where G is an elliptic curve base point and the operation * is a elliptic curve multiplication operation.

7. The method of claim 1, wherein the first processor-specific first device symmetric key is generated by generating the processor-specific first device symmetric key from an identifier of the processor and a chip key.

8. The method of claim 1, wherein deriving the processor-specific first device symmetric key comprises generating, in the first device, the processor-specific first device symmetric key from a chip private key and a global public key of the second device.

9. The method of claim 8, further comprising generating, in the first device, a chip public key from the chip private key and providing the chip public key to the second device.

10. The method of claim 9, wherein the second device generates the chip symmetric key from the global private key and the chip public key, and the method further comprises:
receiving, in the first device, an updated global public key from the second device; and
generating, in the first device an updated processor specific first device symmetric key from a chip private key and the updated public key of the second device.

11. The method of claim 8, wherein the chip private key is generated by generating, in the first device, the chip private key from a one-time-programmable value of the first device and key parameters.

12. The method of claim 11, wherein the key parameters are received from the second device.

13. The method of claim 12, wherein the key parameters specify a public key algorithm for generating the chip private key.

14. The method of claim 1, further comprising generating, in the first device, a chip-unique first device symmetric key from the processor-specific first device symmetric key and a second application identifier.

15. An apparatus for generating a key ladder for communications between devices, comprising:
a first device, comprising:
a processor;
a memory, communicatively coupled to the processor, the memory storing processor instructions comprising processor instructions for:
generating, in the first device, a second processor-specific first device symmetric key from a first processor-specific first device symmetric key and a first identifier;
generating, in the first device, a chip-unique first device application private key from a second identifier and the second processor-specific first device symmetric key; and
generating, in the first device, a chip-unique first device application public key from the chip-unique first device application private key.

16. The apparatus of claim 15, wherein the processor instructions further comprise instructions for providing the chip-unique first device application public key and an identifier of the processor to a second device of the plurality of devices.

17. The apparatus of claim 15, wherein the processor instructions for deriving the processor-specific first device symmetric key comprise processor instructions for generating the processor-specific first device symmetric key from an identifier of the processor and a chip key.

18. The apparatus of claim 15, wherein the processor instructions for deriving the processor-specific first device symmetric key comprise processor instructions for generating, in the first device, the processor-specific first device symmetric key from a chip private key and a global public key of the second device.

19. The apparatus of claim 18, wherein the processor instructions further comprise processor instructions for generating, in the first device, a chip public key from the chip private key and providing the chip public key to the second device.

20. The apparatus of claim 19, wherein the second device generates the chip symmetric key from the global private key and the chip public key, and the processor instructions further comprise instructions for:
receiving, in the first device, an updated global public key from the second device; and
generating, in the first device an updated processor specific first device symmetric key from a chip private key and the updated public key of the second device.

* * * * *